ROBERT C. PRATT
INVENTOR

Dec. 13, 1966  R. C. PRATT  3,290,728
PLASTIC PIPE MOLDING APPARATUS
Original Filed Oct. 10, 1960  3 Sheets-Sheet 3

ROBERT C. PRATT
INVENTOR

BY
ATTORNEYS

United States Patent Office 3,290,728
Patented Dec. 13, 1966

3,290,728
PLASTIC PIPE MOLDING APPARATUS
Robert C. Pratt, Hollywood, Calif., assignor to Babbitt
Pipe Company, Inc., West Hanover, Mass.
Continuation of application Ser. No. 61,526, Oct. 10,
1960. This application Feb. 10, 1964, Ser. No. 362,215
6 Claims. (Cl. 18—19)

The present invention relates to plastic tubular members and the method of and apparatus for manufacturing such members, and is a continuation-in-part of Robert C. Pratt application Serial No. 722,419, filed March 19, 1958, now abandoned, and application Serial No. 846,878, filed October 16, 1959, issued as U.S. Patent No. 3,125,478, and is a continuation of application Serial No. 61,526, filed October 10, 1960, now abandoned.

The invention contemplates the manufacture of such members by winding a preform which is smaller in circumference than the final tubular member and of greater wall thickness, then reducing the wall thickness and increasing the circumference by internally applied pressure.

The tubular members are composite structures of reinforcing material and resin. Various types of material are used, generally being fibrous sheet material such as paper or asbestos, glass webs, glass filaments and glass fabrics.

The object of this invention is an apparatus for manufacturing tubular members using any of the foregoing as reinforcing material and also using them in combination with one another.

One of the features of the apparatus is the utilization of a mandrel having an expansible sleeve or diaphragm. It has been found that the use of the high pressures necessary to produce some plastic pipes will cause the diaphragm to stick to the exterior of the pipe even after the pressure is released. This makes the removal of the mandrel difficult. Also, after a certain number of pipes have been produced, the rubber sleeve will lose some of its resilience and will not return to its original dimensions. This will eventually make it difficult to insert the mandrel into the preformed tube before the pipe-making operation.

Another difficulty is that when using a diaphragm or sleeve which has become enlarged from repeated expansions, suction applied between an ordinary cylindrical tube and its sleeve will not exert sufficient force to effectively reduce the outer diameter of the sleeve, and sticking results.

It is therefore an object of my invention to provide an expansible mandrel which can be quickly and easily withdrawn after forming a plastic pipe. Another object is to provide a mandrel from which the fluid exerting hydraulic pressure can be quickly and easily withdrawn. A further object is to provide a mandrel whose outer elastic sleeve can be used even after it loses its resiliency and begins to increase in diameter.

In the accomplishment of these and other objects, I employ a metal tube for a mandrel and cut into its outer surface a plurality of longitudinally extending grooves. These grooves are spaced circumferentially about the entire periphery of the metal tube. The ends of the grooves at one end of the mandrel terminate at the portion of the tube into which fluid under pressure can be introduced through a conduit.

After a pipe has been molded by the expansion of a mandrel of the type described above with longitudinal grooves, the positive fluid pressure is released, and a negative pressure, or suction, is applied to the fluid conduit. Since the grooves extend the full length of the mandrel, all of the fluid under the sleeve will be readily sucked out, and not trapped in any particular area. As the suction is increased, the interior of the sleeve overlying the grooves is sucked down into the grooves. This positive inward movement of the rubber sleeve in these areas forcibly pulls the sleeve away from the interior of the pipe along the longitudinal lines of the grooves. However, the grooves are spaced sufficiently close to each other so that the pulling away of the sleeve extends circumferentially in both directions toward the adjacent grooves. In this way the sleeve is pulled completely free of the pipe.

Similarly, when a mandrel with an aging sleeve is found to be of too great diameter to fit into a preformed tube prior to the molding operation, suction can be applied to the fluid conduit and the sleeve will be substantially reduced in diameter due to the action of the suction in drawing the adjacent parts of the sleeve into the grooves.

It is a feature of my invention that all the fluid can be withdrawn from the mandrel, and the sleeve pulled away from the inside of the pipe in approximately a minute or less. Another feature of my invention is that fluid can never be trapped within some portion of the mandrel preventing its removal from the pipe. A further feature of my invention is that it substantially extends the useful life of the elastic sleeve used on the mandrel by permitting it to be used after it has lost part of its resiliency. Still another feature of my invention is that the sleeve need not be highly elastic but may comprise a flexible, substantially non-stretching membrane. This is a decided advantage because it permits employment of materials other than rubber which may be better suited for release from certain pipe forming materials, and which may be more capable of withstanding the process temperatures and pressures.

A further requirement and object in an apparatus of this type is that the expansible sleeve may be readily removed for replacement purposes. It is equally essential that the seal between the diaphragm and mandrel also be replaceable and moreover of such construction that pressure may be maintained throughout the molding operations, the pressures used often exceed one thousand p.s.i. It is also important that high vacuum be attained for withdrawal of the sleeve. It is a further feature that the mandrel sleeve, mandrel core and sealing means are separable members and that the sealing means be pressure responsive.

One other important element in the molding of plastic pipe is the reduction in time of the curing cycle for the resin. This is accomplished by rapid heat transfer and another feature of the invention is the provision of means for rapidly heating the preform both from the inside out and outside in.

A still further object is an apparatus for carrying out the processes and assuring the manufacture of rigid, strong, structures in lengths of 20 or more feet and unlimited diameters.

A still further object is an apparatus of relatively simple construction which is operable wherever there is a source of water and steam.

These and other objects will become apparent from the description herein when read with the accompanying drawings wherein.

Figure 1:
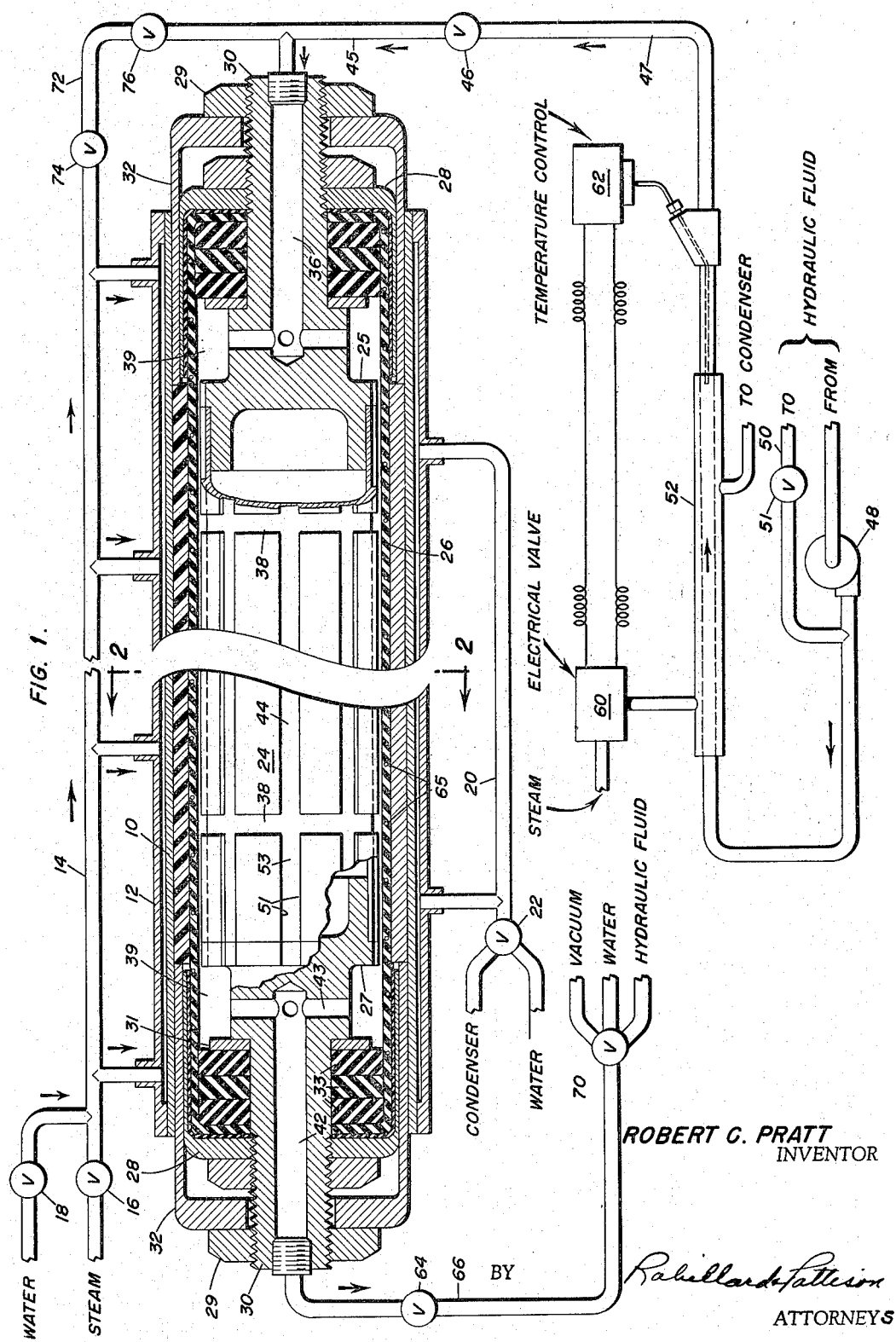
FIG. 1 is a cross sectional view of the apparatus.

Referring to the apparatus shown in FIG. 1 there is shown a cylindrical metal die 10 provided with a surrounding jacket 12 to allow the passing of fluid around the die. The jacket 12 is connected by an inlet passage 14 through a control valve 16 to a source of steam or through a control valve 18 to a source of water. Diametrically opposite the inlet passages the jacket is provided with an outlet passage 20 connected through a control valve 22 to an outlet leading to a condenser or to the water supply. The wall of the die is made sufficiently strong to withstand the internal pressures required, but it is preferably kept at a minimum wall thickness to assure rapid heat conductivity therethrough for reasons subsequently explained.

Located within the die is the complementary mandrel having a metal tubular hollow core 24, closed at its inlet end by a plug 25 and at its outlet end by a plug 27. There is mounted over the core an expansible sleeve 26 which as seen in FIG. 1 also overlies the sealing means which comprise a plurality of rubber washers 33 which inwardly abut against a metal washer 31 which in turn abuts against a shoulder formed on the reduced portion 30 of each end plug, the shoulder being spaced from the end of the hollow core member to provide an annular chamber 39. As seen the end of sleeve 26 is drawn down over the outermost washer and the assembly secured by a cylindrical cap member 28 screw threaded onto the reduced end portion 30.

The inlet mandrel plug 25 is also provided with an inlet passage 36 which leads to a position beyond the sealing means wherein radial passages lead to the annular chamber 39. The outlet plug 27 is likewise provided with radial passages 43 leading to outlet passage 42.

The core member 24 and end plugs are provided with longitudinally extending grooves having walls 51 and floors 53. The dimensions of these walls are in the ratio of one to three. The distance between centers is determined by the size of the pipe being molded, and in the case of pipes from three to eight inches in diameter the distance between centers is not more than one inch with the grooves measuring one-sixteenth inch in depth and three-sixteenths in width. The grooves may also be interconnected by circumferential grooves 38.

The mandrel is held in position within the die by cylindrical collar members 32 which overlie cap members 28 with their inner end abutting the preform and locked in position at their outer end by lock nuts 29 also screw threaded on the reduced end portions 30.

As the mandrels are designed for tubular members 20 or more feet in length they must be sufficiently rigid for ready handling. The provision of the grooves not only permits the sleeve to be withdrawn from the finished pipe but additionally serves to assure simultaneous expansion of the sleeve. If for example only one passage is provided then upon the application of fluid pressure the adjacent section of the sleeve will expand a substantial amount before the fluid moves along the sleeve and when it does an undulating wave is created and the air is trapped at the end of the sleeve. Some improvement is obtained when both inlet and outlet passages are provided as shown herein, but best results are accomplished by the provision of the hollowed-out or chamber portions of the mandrel. With this construction when fluid is introduced it will initially flow through the grooves, flooding the mandrel and forcing out all the air. Thereafter as the pressure is increased the sleeve will expand uniformly away from the core.

To accomplish flooding of the mandrel the inlet passage 36 of the core is connected to a hydraulic fluid passage 45 which connects through a control valve 46 to a hydraulic fluid passage 47 into which hydraulic fluid under pressure is forced by a pump 48. A bypass 50 is provided around the pump with a suitable release 51 to allow recirculation of the hydraulic fluid back to its source if the pressure rises above that for which the valve is set. The hydraulic fluid passage 47 intermediate the control valve 46 and pump 48 is surrounded by a suitable jacket 52 connected through a valve 60 to a source of steam for heating the hydraulic fluid. The temperature of the hydraulic fluid is controlled through valve 60 which is electrically responsive to any suitable type of temperature control means 62 arranged within the passage 47. The sleeve may also be heated by an electrical element 65 embedded therein.

As is apparent, when the control valve 46 is open the hydraulic fluid will enter the mandrel and pass therethrough and to control the pressure within the mandrel there is provided at the outlet end of passage 42 a bleeder valve 64. This valve also connects to a passage 66 which terminates in a three-way valve 70 for directing the hydraulic fluid or water to its proper sources or connecting it to a vacuum pump (not shown).

In carrying out the process the preform is initially placed over the mandrel or the mandrel within the preform. The diaphragm sleeve normally fits close to the mandrel core and the preform substantially fills the space between the sleeve and the inner wall of the die 10. Thereafter the collar members 32 are inserted until they abut against the ends of the preform and are then locked in position.

With the preform so positioned the hydraulic fluid valve 46 is opened permitting fluid to flow into the mandrel. The fluid will initially flow into the inlet annular chamber 39 along the longitudinal grooves 44 into the circumferential grooves 38 and then into the outlet annular chamber 39 and through the outlet passage 42. During this time the bleeder valve 64 is wide open and the circulation of the fluid through the mandrel will force out any air within the grooves.

The fluid being introduced into the mandrel and around the die has been heated and rapid heat transfer will occur causing the resin of the preform to soften and advance. When the proper temperature is reached bleeder valve 64 is closed whereupon pressure will build and expand sleeve 26.

When the curing is accomplished it is essential for rapid manufacture that the finished tubular member be rapidly cooled. To accomplish this cold water is fed to the die jacket 12, the steam valve 60 meanwhile having been closed and heat cut off from the hydraulic fluid. If desired cooling water may also be fed to the mandrel through bypass 72 and valves 74 and 76.

The interior of the tubular member should have a high degree of finish and it would be preferred to do this with a sleeve 26 of expandible metal. This presents structural difficulties and the same result can be accomplished by covering the sleeve 26 with a metallic sleeve 90 which, when the sleeve is in its normal position around the mandrel core, fits snugly thereon. The sleeve 90 is provided with minute corrugations to permit expansion when the sleeve 26 expands. To assure the sleeve being released from the final tubular member its surface may be covered with a silicone resin prior to insertion over the mandrel sleeve 26.

It will also be seen that when pressure is raised the sealing means, which have the same outside diameter as the inside diameter of the sleeve, will be compressed outwardly to firmly secure the end of sleeve 26 against the end of cap member 28 and will simultaneously expand circumferentially to firmly hold the sleeve against the cylindrical walls of cap member 28 with the result that the higher the pressure the greater the force which causes the sealing.

Figure 2:
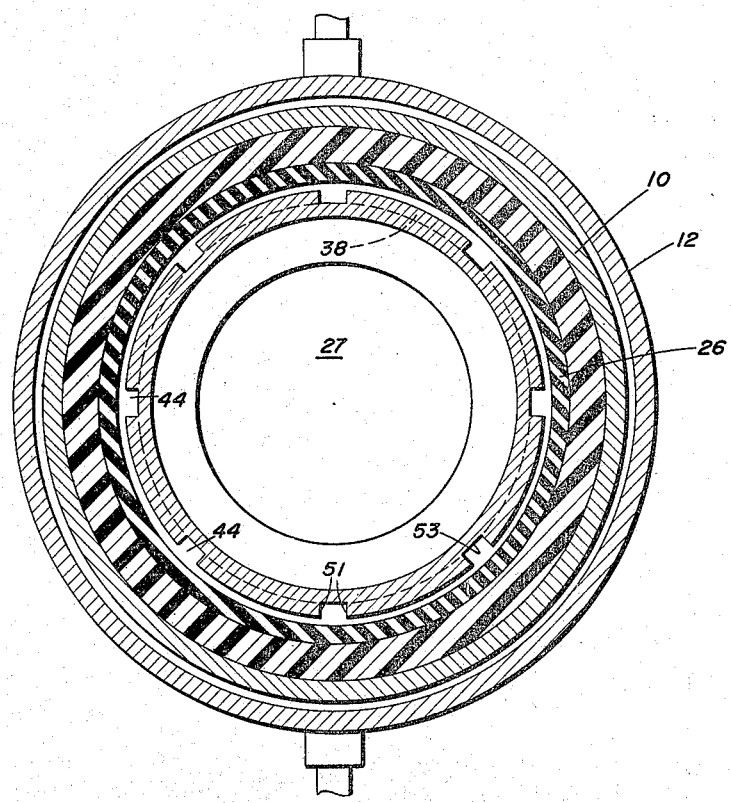
FIG. 2 is a cross sectional view taken on line 2—2 of FIG. 1 with the mandrel diaphragm under positive pressure.
Figure 3:
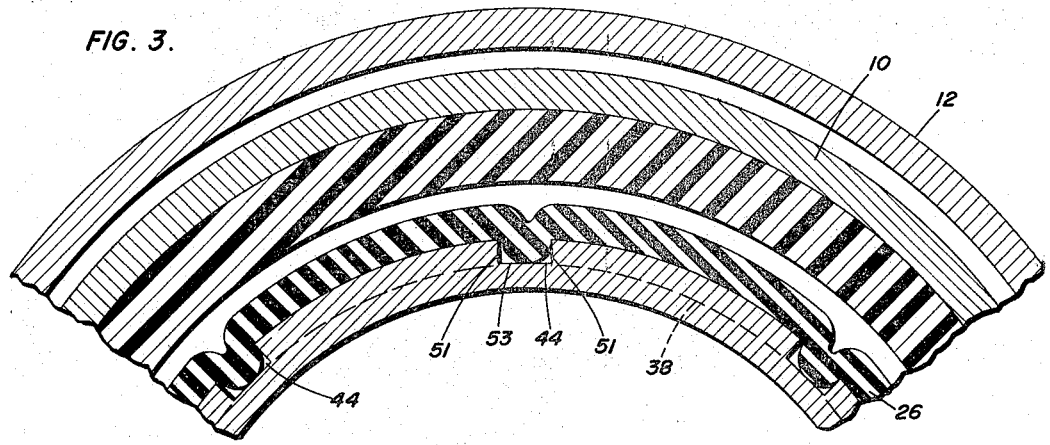
FIG. 3 is a fragmentary enlarged view similar to FIG. 2 but with the mandrel sleeve withdrawn.
Figure 4:
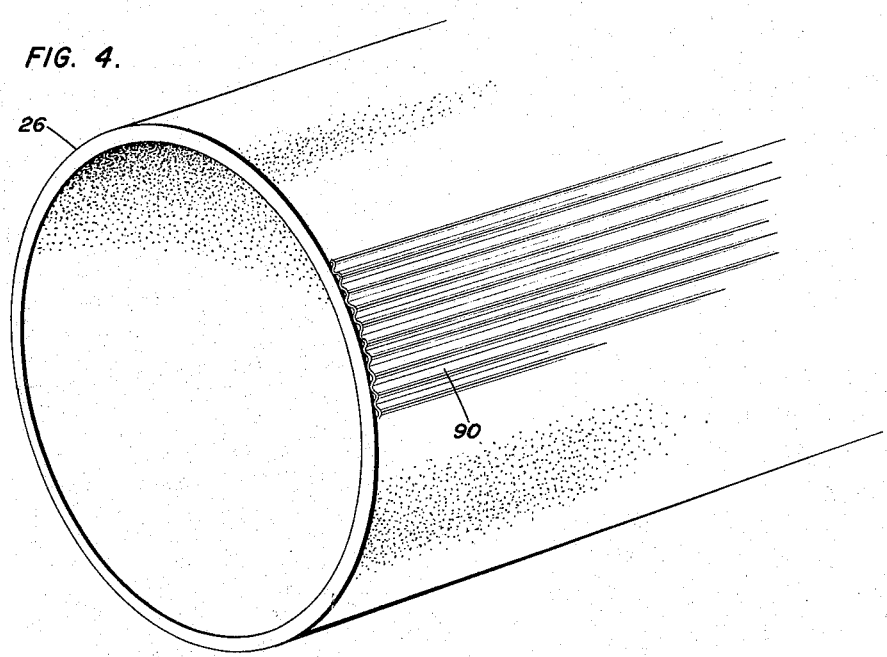
FIG. 4 is a view of a mandrel sleeve used in conjunction with the apparatus of FIG. 1.

When the tube is completed the pressure is released by the closing of all inlet valves and the full opening of outlet valve 64. Valve 70 is then set to vacuum whereupon a negative pressure is established within the mandrel whereupon the sleeve will be withdrawn from the position seen in FIG. 2 (if it has stuck) to the position shown in FIG. 3. As seen therein it is drawn close to the core and into the grooves thus reducing its outer circumference and permitting ready withdrawal of the mandrel.

Figure 5:
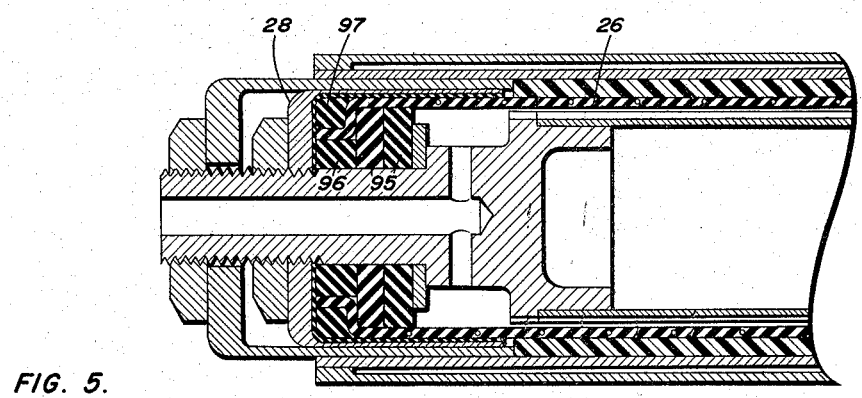
FIG. 5 is a view of one end of the mandrel showing a modified form of sealing means.

Referring to FIG. 5 there is shown a sealing means which is used when the establishment of high vacuum is desired, as for example when heavy walled pipe is used and little clearance normally exists between the preform and mandrel.

As therein shown a plurality of washers 95 are used. The sleeve end is drawn between the outermost washers and then through the end washer which has been divided circumferentially into an inner ring 96 and outer ring 97, with the sleeve end clamped therebetween. When a negative pressure is established within the mandrel, positive pressure will act on rings 96 and 97 compressing and expanding them thus assuring a positive seal.

What is claimed is:

1. Apparatus for molding hollow cylindrical plastic articles comprising a cylindrical shell, a pipe preform support adapted for insertion in said shell including a mandrel, grooves in the outer surface of said mandrel communicating with the ends thereof, an expansible sleeve covering said mandrel and secured at its ends to the mandrel, means for introducing fluid under high pressure between said sleeve and mandrel whereby a pipe preform may be formed into a finished pipe, means for drawing a vacuum between said mandrel and sleeve, whereby atmospheric pressure may enter between said formed pipe and sleeve and separate said sleeve from said pipe and depress said sleeve into said grooves, in which position said mandrel and sleeve may be twisted as a unit relative to said pipe to promote release of said pipe from said sleeve.

2. A mandrel for use in the molding of pipe comprising a cylindrical core of rigid material, a plurality of grooves extending from one end of the mandrel to the other, a sleeve covering the mandrel and secured at its ends to the mandrel and means for forcing fluid under positive pressure along said grooves and thence circumferentially under said sleeve to expand said sleeve so that said sleeve may exert an outward pressure against the interior of a surrounding tube being molded and means for applying a negative pressure to said grooves whereby the fluid expanding said sleeve will be withdrawn to contract said sleeve about said mandrel and said sleeve will be drawn downwardly into said grooves to pull those areas of the sleeve located above said grooves away from the corresponding interior areas of said molded pipe whereby removal of said mandrel from said finished molded pipe may be facilitated.

3. A mandrel for use in the manufacture of hollow plastic molded articles, comprising a core piece, walls forming grooves running longitudinally on said core piece, an expansible sleeve surrounding said core piece, means for first introducing hydraulic pressure between said sleeve and core piece, and second for exhausting said fluid and forming a negative pressure between said sleeve and core piece, whereby atmospheric pressure will depress said sleeve into said grooves and removable sealing means for the ends of said sleeve underlying the sleeve and sleeve ends.

4. A mandrel for use in the manufacture of hollow plastic molded articles comprising a core piece, walls forming longitudinal grooves on said core piece, walls forming an annular chamber around said core piece at one end thereof and communicating with said longitudinal grooves, a conduit within said core piece communicating with said annular chamber, washers of an elastic material at each end of said core piece adjacent to the outer end of said annular chamber, an elastic diaphragm surrounding said core and extending beyond and folded down over the outer face of the end washer, and metal caps one at each end of said core piece holding said diaphragm tightly compressed around said washers.

5. A mandrel comprising a rigid tubular core, the outer surface of the core having a plurality of grooves extending substantially the full length thereof, an expansible sleeve surrounding the outer surface of the core, means securing the sleeve ends to the core beyond the ends of the longitudinally extending grooves, an inlet fluid passage leading from the outer surface of the core beneath the sleeve and adjacent one end of the longitudinal grooves to the exterior of the core beyond the sleeve, and an outlet fluid passage leading from the outer surface of the core beneath the sleeve and adjacent the other end of the longitudinally extending grooves to the exterior of the core beyond the sleeve.

6. A mandrel comprising a corepiece, a reduced end portion extending from the end thereof, a removable elastic washer carried on the end portion, means on the end portion associated with and spacing the washer from the adjacent end of the corepiece and defining an annular chamber therebetween, an expansible open ended sleeve surrounding the washer, annular chamber and corepiece, the open end of the sleeve being folded down over the outer face of the washer, a removable metal cap compressing the folded end of the sleeve against the outer face of the washer, said reduced end portion having a fluid passage leading from its outer end to the annular chamber.

References Cited by the Examiner

UNITED STATES PATENTS

| | | | |
|---|---|---|---|
| 1,140,527 | 3/1915 | Powell | 18—45 |
| 1,605,782 | 11/1926 | Rota | 18—128 |
| 1,981,201 | 11/1934 | Semler | 18—45 |
| 2,062,767 | 12/1936 | Sexton. | |
| 2,206,410 | 7/1940 | Lally | 25—128 |
| 2,386,504 | 10/1945 | Pfoaps | 18—45 |
| 2,393,979 | 2/1946 | Everett | 18—19 X |
| 2,401,728 | 6/1946 | Gillette et al. | 18—19 |
| 2,542,874 | 2/1951 | Locatelli | 25—138 X |
| 2,612,673 | 12/1952 | Billner | 25—128 |
| 2,716,777 | 6/1955 | Hagen | 18—19 X |
| 2,723,426 | 11/1955 | Pelley | 18—35 |
| 2,779,996 | 2/1957 | Tanis | 18—1 X |
| 2,780,273 | 2/1957 | Roberts. | |
| 2,826,784 | 3/1958 | Pratt | 18—19 |
| 2,865,078 | 12/1958 | Hasselblad | 25—128 |
| 2,888,712 | 6/1959 | Kramer et al. | 18—19 |
| 2,903,744 | 9/1959 | Harrison et al. | 18—19 |

FOREIGN PATENTS

| | | |
|---|---|---|
| 960,081 | 4/1950 | France. |

WILLIAM J. STEPHENSON, *Primary Examiner.*